(12) United States Patent
Atassi

(10) Patent No.: US 7,994,927 B2
(45) Date of Patent: Aug. 9, 2011

(54) WATER METER WITH AN EMERGENCY SHUT-DOWN

(76) Inventor: Mohamed Radwan Rafaat Atassi, Cairo (EG)

(*) Notice: Subject to any disclaimer, the term of this patent is extended or adjusted under 35 U.S.C. 154(b) by 227 days.

(21) Appl. No.: 12/282,733

(22) PCT Filed: Mar. 12, 2006

(86) PCT No.: PCT/EG2006/000011
§ 371 (c)(1),
(2), (4) Date: Sep. 12, 2008

(87) PCT Pub. No.: WO2007/104320
PCT Pub. Date: Sep. 20, 2007

(65) Prior Publication Data
US 2009/0085756 A1    Apr. 2, 2009

(51) Int. Cl.
*G08B 21/00* (2006.01)
(52) U.S. Cl. ........................ 340/609; 340/606

(58) Field of Classification Search .......... 340/603, 340/604, 605, 606, 608, 609, 610, 615, 616; 137/487.5, 459, 624.12; 251/192
See application file for complete search history.

(56) References Cited

U.S. PATENT DOCUMENTS

| 5,782,263 | A  | * | 7/1998  | Isaacson et al. | ........... 137/487.5 |
| 5,979,493 | A  | * | 11/1999 | Simpkins, Jr. | ............. 137/487.5 |
| 6,119,720 | A  | * | 9/2000  | Isaacson et al. | .............. 137/459 |
| 6,837,271 | B1 | * | 1/2005  | Saint | ........................ 137/624.12 |
| 2008/0073607 | A1 | * | 3/2008 | Atassi | ............................. 251/92 |

* cited by examiner

*Primary Examiner* — Van T. Trieu
(74) *Attorney, Agent, or Firm* — Abelman, Frayne & Schwab

(57) ABSTRACT

A water meter with an emergency shutdown is a dual purpose water meter, which records the accumulated water consumption of individual runs as any regular water meter, and detects water leakage or uncontrolled flow by comparing each single continuous run in non-equal batches with a set target quantity. The water meter shuts down the water flow if a single continuous run reach that target. The water meter is adaptable to any type of water meter or method of recording, turbine, vertical turbine, positive displacement, multiple jet, propeller, or magnetic or electronic flow measuring.

6 Claims, 4 Drawing Sheets

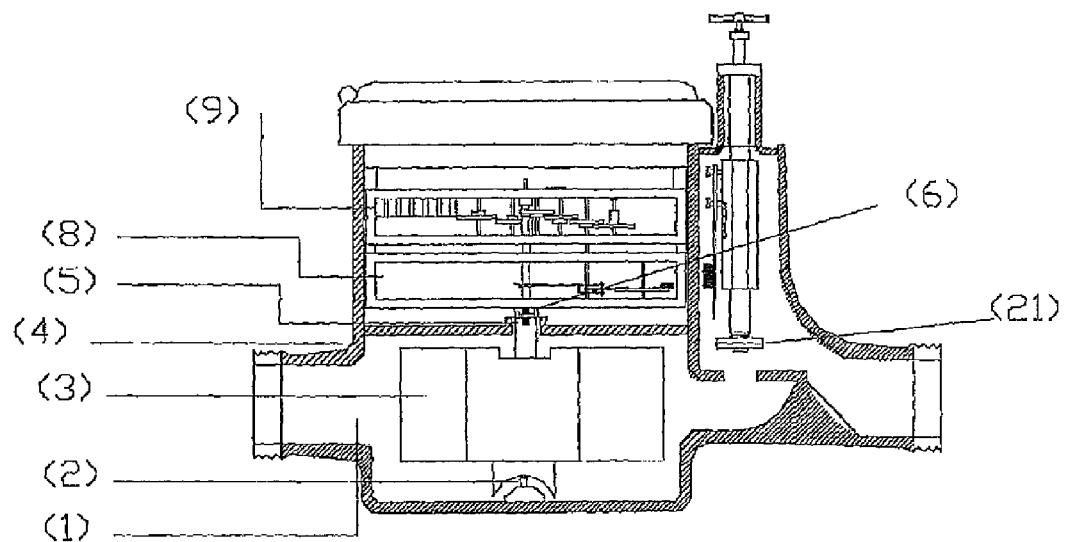
FIG (1)
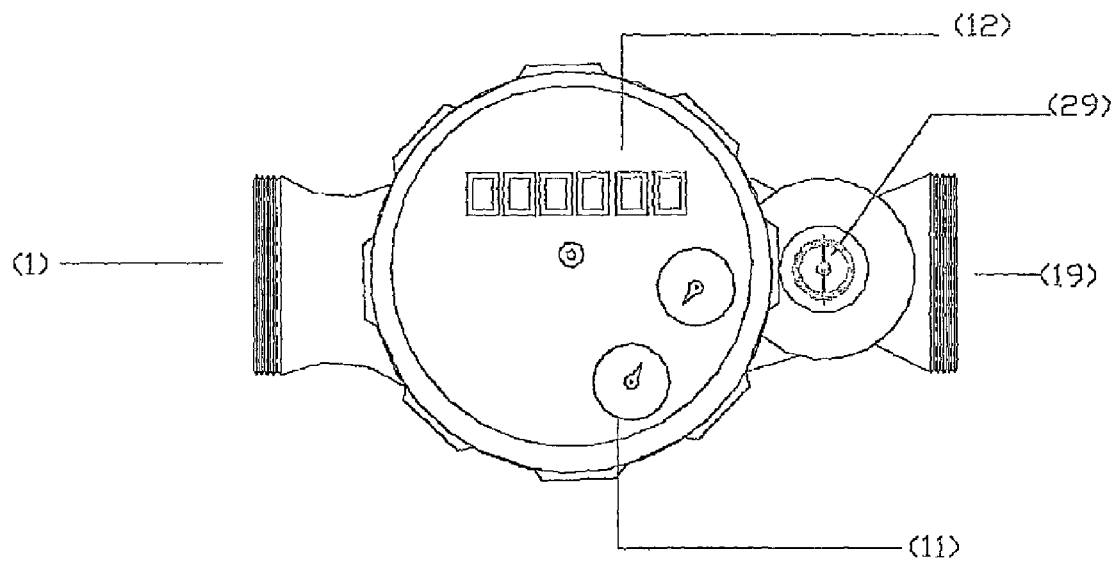
FIG (2)

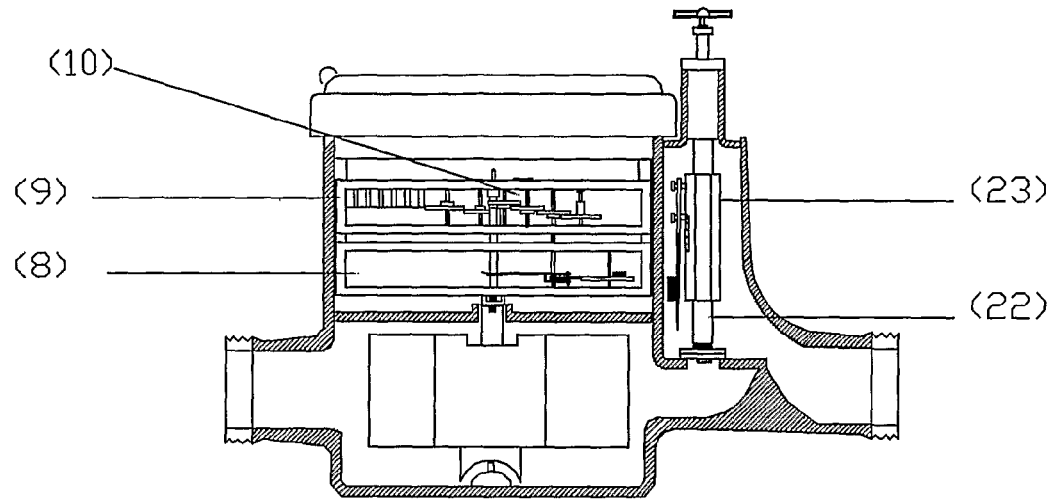
FIG (3)
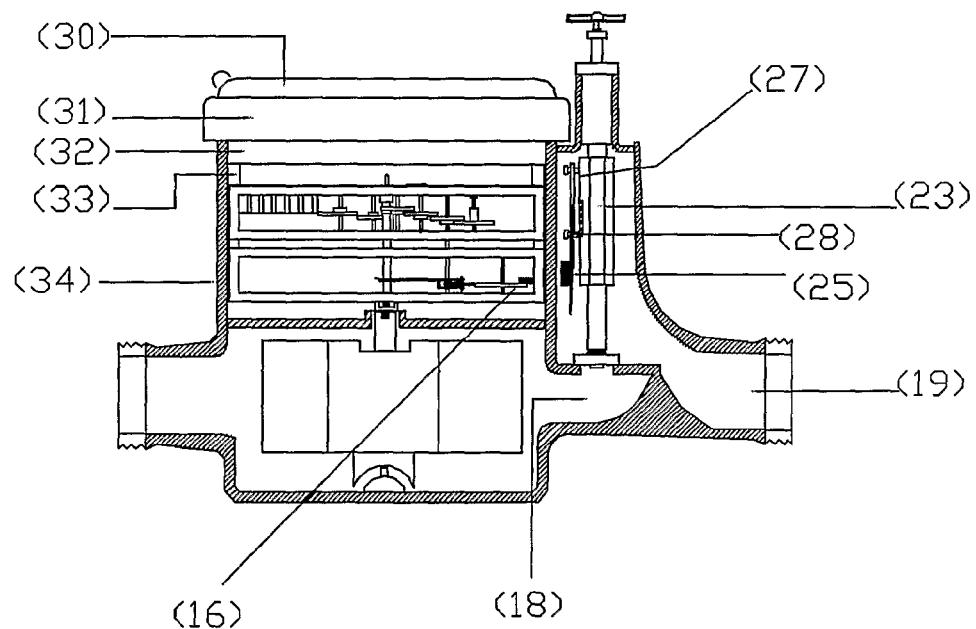
FIG (4)

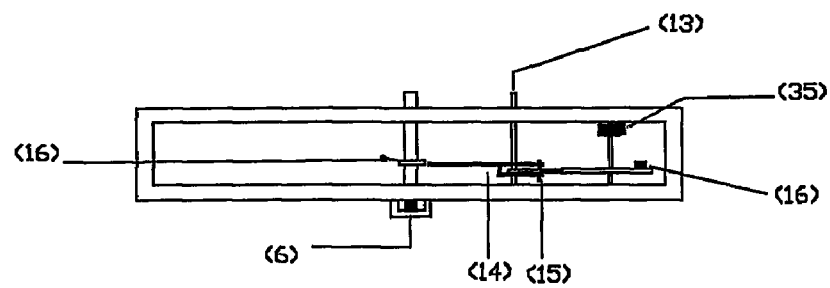
FIG (5)
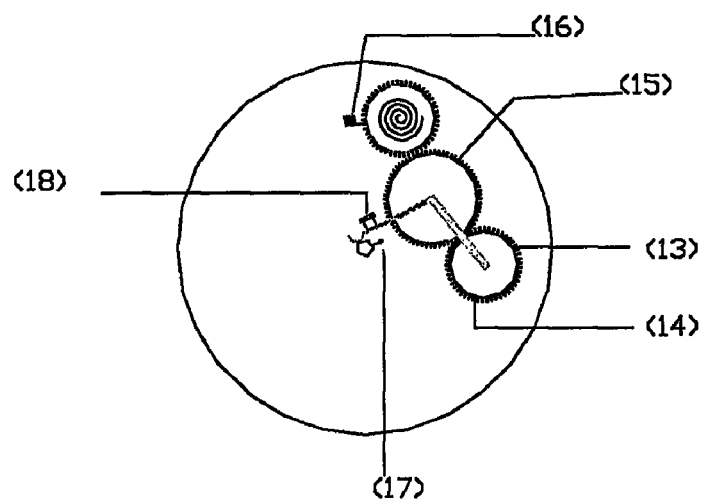
FIG (6)
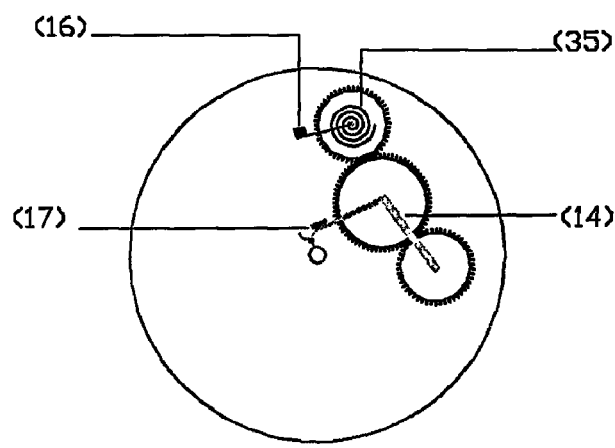
FIG (7)

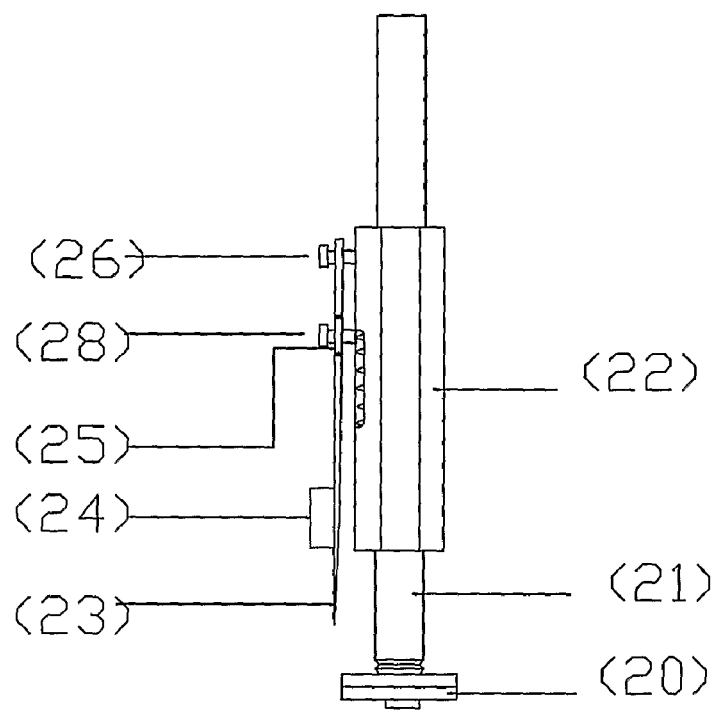
FIG (8)
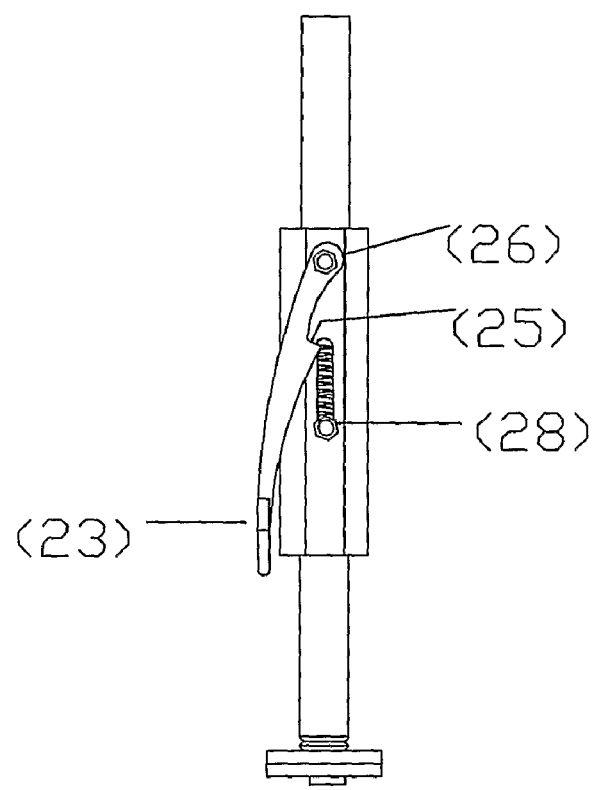
FIG (9)

WATER METER WITH AN EMERGENCY SHUT-DOWN

CROSS-REFERENCE TO RELATED APPLICATIONS

This application is a 371 of international application number PCT/EG2006/000011, filed on Mar. 12, 2006.

BACKGROUND OF THE INVENTION

1. Field of the Invention

This invention relates to adding a feature of an emergency shut down to any water meter.

2. Description of the Related Art

All water meters have a way to measure the amount of liquid passing while it is flowing, to stop recording when the flow stops, and to re-continue the recording when the flow restarts. The summations of runs form a total. Some water meters have batch measuring, and also they continue recording until re-set. It is very rare for a water meter to run continuously for a long time. The quantity flowing in a single run depends on the number of users the water meter is serving like an apartment, a single house, a commercial building or a housing compound.

In normal usage, a single run amount could be double the average of runs or tripled or even being six fold of the average runs, and beyond that, it means there is a leakage, or an unattended outlet keeping the water meter to continue on recording.

In practice, the only way to cut the flow of water is either at the end of a specific batch or manually when the leaked water become visible, but this will cause a great deal of damage in buildings furniture beside the water losses.

The water meter already measures the amount flowing in each single run from its start and added it up to a previous registered quantity so if we copied this single run recording and compare it with a maximum target allowed, then, if the amount flowing continuously in a single run reach that target, this means an emergency exists due to leakage or uncontrolled flow.

If there is an irrigation system in the house, it will be shown as a leak. In this case irrigation water should be taken out of an expansion tank to allow the single run mechanism to be re-set when the tank is full at intervals.

We could link the set target with a mechanism to shutdown a valve, so now we have a means to detect the leakage or uncontrolled flow in addition to its function as a water meter.

BRIEF SUMMARY OF THE INVENTION

When the water passes through the water meter, it starts recording the quantity passing, and when the water stops, recording will stop. This is applied even for those water meters which have an independent register for batches. This marginal recording in a single continuous run will be added up to the previous old recording as a total in a totalizer. If this single runs movement is copied and compared with a maximum feasible run, then we have a means to detect the leakage or uncontrolled flow of fluid. If we raise the set of registers upward and create a new layer in the totalizer, the top register layer functions exactly as the original regular water meter.

Then we copy the movement from any of the first few gears of the recording set in a new separate set of gears in the down layer of totalizer. The copied movement goes through a reduction gear train to reduce the final gear rotation to about a half of rotation. The gear train has a movable gear to engage when the flow starts, and disengage when the flow stops. The final gear has a self return spring to clear out the rotation each time the water flow stops to restart again from the beginning at each run. At its end, the final gear has a pointer with a small magnet. If the flowing amount in a single run reaches the set targets, the magnet on the pointer of the single run gear reaches the shut down point, and were it to pull another magnet placed on a ratchet in the shut down valve, it force the flow to stop.

The set target could be changed within a small range by relocating the magnet on the limit gear when a larger range needs a new reduction gear to be added to the geartrain of the single run register.

The shut down valve has a telescopic column. In its short position with a spring under compression, a ratchet hold the inner and outer columns together, and the end of the ratchet has a magnet so that when it is pulled out by the magnet of the single run gear the ratchet releases the inner portion of the valves column, so it expands the column which forces the valve to shutdown.

The invention is a regular water meter with two additions. The first is to add a separate register to the single runs, and the second is to pass either the input or output of the water meter through a valve merged to the water meter.

BRIEF DESCRIPTION OF THE SEVERAL VIEWS OF THE DRAWINGS

FIG. 1 shows a dry water meter where a turbine transfers the rotation to magnet 5 on a main drive of the two registers: register 8 of a single run and register 9 of the regular water meter totalizer. The valve seal 21 is in open position as in its normal configuration.

FIG. 2 shows a plan view of the water meter, the analog reading 11, the numerical reading 12, the water in 1, the water out 19 and the valve handle 29.

FIG. 3 shows a regular manual closing of the valve where the valve column 22 goes down to close the valve while keeping the telescopic portion 23 under compression mode. The valve could be opened in the same manner.

FIG. 4 shows the valve closed as in an emergency. When the magnet 16 pulled the ratchet 24 with its magnet 25 to release the pin 28 out of hook 27, it forces the inner portion the telescopic column 23 to expand and close the valve.

FIG. 5 shows the register of the single run, when the drive come from 13 to the clutching gear 15 which in turn engages to connect to limit gear 16 and its magnet.

FIG. 6 shows the clutching gear 15 disengaged from gear 16 under the pressure of sponge 18 and the self return spring 35.

FIG. 7 shows the clutching pin 17 push the clutching arm 14 to engage gear 15 with gear 16 to start recording the quantity of the single run.

FIGS. 8-9 show the detail of the telescope column of the valve.

DETAILED DESCRIPTION OF THE INVENTION

The present invention is related to international application number PCT/EG2006/000011, filed on Mar. 12, 2006, which is incorporated herein by reference in its entirety.

As shown in FIGS. 1-9, the present invention is a fluid meter, such as a water meter, implementing the features described herein, including an automatic emergency shut-down feature. The fluid meter includes a fluid-in chamber 1 having a valve seal 21 with the fluid-in chamber 1 permitting the flow of fluid therethrough when the valve seal 21 is open.

A turbine 3 is in the fluid-in chamber 1 and has a turbine axle 2, with the turbine 3 rotating the turbine axle 2 as fluid flows in the fluid-in chamber 1. A magnet 6 is connected to the turbine axle 2, and the magnet 6 is driven to move by the rotation of the turbine axle 2. A single run register 8 registers single runs of movements of the magnet 6 representing a quantity of fluid passing from each start of flowing of the fluid. A totalizer register 9 registers totals of the single runs, clears the reading automatically when the flow of fluid stops, and stops the flow of fluid by closing the valve seal 21 only when the quantity of fluid passing through the fluid-in chamber 1 exceeds a preset target.

The fluid meter is any liquid meter permitting the flow of liquid, such as water. The valve seal shuts down the flow of fluid only when a target quantity of fluid is reached in a single continuous flow without interruption as an indication of an emergency. The register 9 clears the reading when the flow stops automatically, and in only in one special case, when flow runs continuously to reach the preset target, then the register 9 sends a signal to the valve seal 21 to shut down the flow.

A valve is included with an expandable valve column 23 which expands when the valve receives the signal to close the valve in an emergency. Means are also included to estimate a continuous single run quantity of fluid to compare with an average regular consumption as an indication of an emergency.

FIG. 1 shows a dry water meter where turbine transfers the rotation to a magnet 5 on main drive of the two registers: the register 8 of a single run, and register 9 of the regular water meter totalizer. The valve seal 21 is in open position as in its normal configuration. A sealing disc 4 is also included.

FIG. 2 shows a plan view of the water meter, with the analog reading 11, the numerical reading 12, the water-in chamber 1, the water-out chamber 19, and the valve handle 29.

FIG. 3 shows a regular manual closing of the valve where the valve column 22 goes down to close the valve while keeping the telescopic portion 23 under compression mode. The valve could be opened in the same manner. The meter also includes a gear set 10 of the registers 8, 9.

FIG. 4 shows the valve closed as in an emergency. When the magnet 16 pulled the ratchet 24 with its magnet 25 to release the pin 28 out of a ratchet hook 27, it forces the inner portion the telescopic column 23 to expand and close the valve. The meter also includes a water meter lid 30, a water meter copper cap 31, glass 32, a spacer 33, and a water meter body 34.

FIG. 5 shows the register of the single run, when the drive come from 13 to the clutching gear 15 which in turn engages to connect to limit gear 16 and its magnet. A sponge 18 and a self-return spring 35 are also included.

FIG. 6 shows the clutching gear 15 disengaged from gear 16 under the pressure of the sponge 18 and the self-return spring 35.

FIG. 7 shows the clutching pin 17 push the clutching arm 14 to engage gear 15 with gear 16 to start recording the quantity of the single run.

FIGS. 8-9 show the detail of the telescope column of the valve, with a water out of valve 20, a valve seal 21, a valve column 22, a telescopic column 23, a ratchet 24, a magnet 25 on the ratchet 24, a ratchet hinge 26, and a pin of hooks 28.

REFERENCE NUMERALS

1. Water-in
2. Turbine axle
3. Turbine
4. Sealing disc
5. Driver magnet
6. Driven magnet
8. Single run register
9. Totalizer register
10. Gear set
11. Analog reading
12. Numerical reading
13. Drive of single run
14. Clutching arm
15. Clutching gear
16. Limit gear and magnet
17. Clutching pin
18. Sponge
19. Water out
20. Water out of valve
21. Valve seal
22. Valve column
23. Telescopic column
24. Ratchet
25. Magnet on ratchet
26. Ratchet hinge
27. Ratchet hook
28. Pin of hooks
29. Handle of valve
30. Water meter lid
31. Water meter copper cap
32. Glass
33. Spacer
34. Water meter body
35. Self return spring

What is claimed is:

1. A fluid meter with an automatic emergency shutdown feature, the fluid meter comprising:
   a fluid-in chamber (1), a fluid-out chamber (19), and a valve (21) movable between an open position and a closed position, wherein said valve is positioned to permit the flow of fluid from the fluid-in chamber (1), through the meter, and out the fluid-out chamber (19) when the valve (21) is open, and wherein said valve (21) includes a trip mechanism for causing the valve seal to move to its closed position, thereby blocking the flow through the meter;
   a turbine (3) rotatably mounted in the fluid-in chamber (1) such that the turbine (3) rotates when fluid flows through the meter;
   a magnet (6) mounted within the meter so as to be rotated by the turbine (3); and
   a single run register (8) including:
   (i) a self clutching mechanism which engages automatically when flow starts and disconnects automatically when flow stops;
   (ii) a recording mechanism driven by rotation of the magnet (6) when fluid is flowing through said meter and said self clutching mechanism is engaged, to record the amount of fluid which passes through the meter, beginning at a zero value, and to activate said trip mechanism, to stop the flow of fluid, if the quantity of fluid which has passed through the meter exceeds a preset target; and
   a spring member which, upon disengagement of said self clutching mechanism, resets the recording mechanism to a zero value;
   wherein said valve is disposed outside of said single run register and said trip mechanism includes a tripping magnet, and wherein said recording mechanism comprises a limit gear having a limit gear magnet (16) inside said single run register which engages the tripping magnet magnetically when flow exceeds the preset target, to actuate the trip mechanism;

wherein said recording mechanism further comprises a drive gear (13), and wherein said self clutching mechanism comprises a clutching gear (15) and a clutching arm (14) which moves said gear (15) into and out of engagement with said drive gear for selectively connecting and disconnecting said clutching gear and said drive gear.

2. The fluid meter as in claim 1, wherein the fluid meter further comprises a totalizer register which includes a mechanism which rotates with said magnet to record the total amount of fluid passing through the meter for a plurality of runs.

3. The fluid meter as in claim 1, where in the fluid is water.

4. The fluid meter as in claim 1, wherein the valve seal shuts down the flow of fluid mechanically only when a target quantity of fluid is reached in a single continuous flow without interruption as an indication of an emergency.

5. The fluid meter as in claim 1, where in the register (9) clears the reading when the flow stops automatically without any external power; and wherein, in only one special case, when the flow runs continuously to reach the preset target, the register (9) sends a mechanical signal without external power source to the valve seal (21) to shut down the flow.

6. The fluid meter as in claim 5, further comprising:

a single run quantity is set for each unit, which represents the target, to compare with an actual consumption as an indication of an emergency.

\* \* \* \* \*